United States Patent
He et al.

(10) Patent No.: US 8,818,790 B2
(45) Date of Patent: Aug. 26, 2014

(54) SYNTACTIC ANALYSIS AND HIERARCHICAL PHRASE MODEL BASED MACHINE TRANSLATION SYSTEM AND METHOD

(75) Inventors: Liang He, Nanjing (CN); Zhangliang Xiong, Nanjing (CN); Lei Wan, Nanjing (CN)

(73) Assignees: Samsung Electronics Co., Ltd., Suwon-si (KR); Samsung Electronics (China) R&D Center, Nanjing (CN)

( * ) Notice: Subject to any disclaimer, the term of this patent is extended or adjusted under 35 U.S.C. 154(b) by 705 days.

(21) Appl. No.: 13/079,283

(22) Filed: Apr. 4, 2011

(65) Prior Publication Data
US 2011/0246177 A1 Oct. 6, 2011

(30) Foreign Application Priority Data

Apr. 6, 2010 (CN) .......................... 2010 1 0144623
Mar. 2, 2011 (KR) ........................ 10-2011-0018439

(51) Int. Cl.
*G06F 17/28* (2006.01)
(52) U.S. Cl.
CPC ........ *G06F 17/2818* (2013.01); *G06F 17/2827* (2013.01)
USPC ............................ 704/3; 704/2; 704/5; 704/9
(58) Field of Classification Search
CPC .......................... G06F 17/2818; G06F 17/2827
USPC ................................................ 704/2, 3, 5, 9
See application file for complete search history.

(56) References Cited

U.S. PATENT DOCUMENTS

2008/0306725 A1* 12/2008 Moore ............................... 704/2

OTHER PUBLICATIONS

Xia, Fei, and Michael McCord. "Improving a statistical MT system with automatically learned rewrite patterns." Proceedings of the 20th international conference on Computational Linguistics. Association for Computational Linguistics, 2004.*
Vela, Mihaela, and Silvia Hansen-Schirra. "The Use of Multilevel Annotation and Alignment for the Translator." Translating and the Computer 28 (2006): 14.*
Xiang, Bing, Bowen Zhou, and Martin Cmejrek. "Towards integrated machine translation using structural alignment from syntax-augmented synchronous parsing." Automatic Speech Recognition & Understanding, 2009. ASRU 2009. IEEE Workshop on. IEEE, 2009.*
Hansen-Schirra, Silvia, Stella Neumann, and Mihaela Vela. "Multi-dimensional annotation and alignment in an English-German translation corpus." Proceedings of the 5th Workshop on NLP and XML: Multi-Dimensional Markup in Natural Language Processing. Association for Computational Linguistics, 2006.*

* cited by examiner

*Primary Examiner* — Vincent P Harper
(74) *Attorney, Agent, or Firm* — Jefferson IP Law, LLP

(57) ABSTRACT

A syntactic analysis and hierarchical phrase model based machine translation system and method are provided. The machine translation system includes a word alignment module, a phrase extraction module, a gender syntactic annotation module, a syntactic based noncontiguous phrase abstract module, a noncontiguous phrase based translation module and an evaluation module. The machine translation system and method performs syntactic analysis based on a common contiguous phrase based machine translation model, and extracts a syntactic based noncontiguous phrase rule set from a bilingual aligned text, so as to address and issue of noncontiguous fixed custom in context of a whole sentence, and to comply with syntactic features of a language, translation is performed based on the noncontiguous phrase rule set and the phrase aligned table, and the translation results are evaluated based on the evaluation model, thereby improving the translation result.

15 Claims, 9 Drawing Sheets

| AD | adverb | 还 |
|---|---|---|
| AS | aspect marker | 着 |
| BA | 把 in ba-construction | 把, 将 |
| CC | coordinating conjunction | 和 |
| CD | cardinal number | 一百 |
| CS | subordinating conjunction | 虽然 |
| DEC | 的 in a relative-clause | 的 |
| DEG | associative 的 | 的 |
| DER | 得 in V-de const. and V-de-R | 得 |
| DEV | 地 before VP | 地 |
| DT | determiner | 这 |
| ETC | for words 等, 等等 | 等, 等等 |
| FW | foreign words | ISO |
| IJ | interjection | 啊 |
| JJ | other noun-modifier | 男, 共同 |
| LB | 被 in long bei-const | 被 |
| LC | localizer | 给 |
| M | measure word | 里个 |
| MSP | other particle | 所 |

FIG.2C

```
I -- TOP
    I -- IP
        I -- NO
            I --NN 停车
        I -- VP
            I --VV 多
        I --NP
            I -- ADJP
                I -- JJ 长
            I -- NP
                I -- NN 时间
        I -- PU ?
```

FIG.2D

```
| -- TOP
    | -- CP
        | -- IP
            | --VP
                | --VV 能
                | --VP
                    | --VV 给
                    | -- NP
                        | --PN 我
                    | -- NP
                        | -- QP
                            | -- CD 两        → [X]
                            | -- CLP
                                | -- M 张
                        | -- NP
                            | -- NN 地铁      → [X]
                            | -- NN 路线图
            | -- SP 吗
            | -- PU ?
``` remaining rules :
能给我两张[X]吗? ||| Could you give me two [X] ? ||| 0.2 0.2 0.1
能给我[X]张地铁路线图吗? ||| Could you give me [X] subway maps?
||| 0.1 0.1 0.2 a filtered out rule:[X]给我地铁路线图吗?
||| [X] you give me two subway maps? ||| 0.1 0.1

FIG.5

SYNTACTIC ANALYSIS AND HIERARCHICAL PHRASE MODEL BASED MACHINE TRANSLATION SYSTEM AND METHOD

PRIORITY

This application claims the benefit under 35 U.S.C. §119 (a) of a Chinese patent application filed in the Chinese Intellectual Property Office on Apr. 6, 2010 and assigned Serial No. 201010144623.8 and a Korean Patent Application filed in the Korean Intellectual Property Office on Mar. 2, 2011 and assigned Serial No. 10-2011-0018439, the entire disclosures of which are hereby incorporated by references.

BACKGROUND OF THE INVENTION

1. Field of the Invention

The present invention relates to machine translation. More particularly, the present invention relates to a syntactic analysis and hierarchical phrase model based machine translation system and method.

2. Background of the Invention

Machine translation is auto-translation for translating one language into another language. A plurality of different machine translation systems has been developed, and a currently popular system is a contiguous phrase based machine translation system. The issue to be addressed by the machine translation is the auto-translation (automatic translation, without human intervention) of a sentence or a segment in a source language into a sentence or a segment in a corresponding target language. Corpus based machine translation includes a bilingual aligned corpus (each sentence in the source language corresponds one or more sentences in the target language), and data and knowledge required for auto-translation of a computer can be obtained from the bilingual aligned corpus.

The contiguous Phrase Based Machine Translation (PBMT) system performs translation in a basic unit of phrase. In the translation procedure, the system performs translation with a plurality of contiguous words, rather than translating each word independently. Since a phrase based translation method enlarges granularity for translation, the phrase based translation method can easily deal with dependent relationships in context, and can translate phrases and idioms. Generally, in the phrase based translation method, the phrase can be an arbitrary and contiguous character string, without syntactic restriction, so that bilingual phrases can be conveniently and automatically extracted from the bilingual aligned corpus having word alignment, so as to be translated to as a sentence in a specific source language.

The phrase based translation method needs to train the system. When training, a bilingual aligned corpus (a group of sentences to be translated) is input. It can be seen from a result of word alignment which words in a sentence can be translated with each other. The phrase based translation method also needs to extract phrases, that is, a contiguous word string which can be translated with each other, from the bilingual aligned corpus, regardless of these words having actual meaning or not.

The PBMT system has several defects. Due to dependent relationships in context, the PBMT system cannot smoothly process a longer sentence or phrase, and especially has a problem of ordering for a long distance due to noncontiguous phrases. Because the machine translation system is completely dependent on statistical information of contiguous phrases, ignores a language syntactic feature, and knowledge included in the corpus cannot be utilized fully, improvement of translation performance is limited.

SUMMARY OF THE INVENTION

Aspects of the present invention are to address at least the above-mentioned problems and/or disadvantages and to provide at least the advantages described below. Accordingly, as aspect of the present invention is to provide a syntactic analysis and hierarchical phrase model based machine translation system and method.

According to an aspect of the present invention, a syntactic analysis and hierarchical phrase model based machine translation system is provided. The machine translation system includes a preprocessing part for obtaining a syntactic based noncontiguous phrase rule set through a phrase alignment table obtained from a bilingual aligned text and a syntactic annotated corpus obtained from an annotated corpus and a translation engine for outputting a translation result with respect to input sentences through the syntactic based noncontiguous phrase rule set received from the preprocessing part.

According to an exemplary implementation of the above aspect, the preprocessing part includes a word alignment module for receiving a bilingual aligned text, and for obtaining word alignment information from the received bilingual aligned text, a phrase extraction module for receiving the word alignment information from the word alignment module, and for extracting phrases based on the received word alignment information so as to obtain a phrase alignment table, a gender syntactic annotation module for receiving an annotated corpus and the bilingual aligned text, for extracting extracts language knowledge and probability information from the annotated corpus, for annotating bilingual or monolingual in bilingual aligned text with respect to gender and syntax based on the abstracted useful language knowledge and probability information, and for generating the syntactic annotated corpus, and a syntactic based noncontiguous phrase extraction module for receiving the syntactic annotated corpus from the gender syntactic annotation module, for performing syntactic based noncontiguous phrase extraction according to alignment information generated by the word alignment module or the phrase alignment table generated by the phrase extraction module based on the syntactic annotated corpus, so as to generate a syntactic based noncontiguous phrase rule set.

According to another exemplary implementation of the above aspect, the translation engine includes a noncontiguous phrase based translation module for receiving the syntactic based noncontiguous phrase rule set from the syntactic based noncontiguous phrase abstract module, and for searching all of the possible phrases, translations, and probabilities thereof in the noncontiguous phrase rule set according to the translation model with respect to a sentence to be translated, and for outputting translation results based on the sentence to be translated and the search, and an evaluation module for receiving an evaluation model, for evaluating the translation results based on the evaluation model, and for outputting a translation result with the highest score according to the evaluation.

According to another exemplary implementation of the above aspect, the translation engine further includes a contiguous phrase based translation module for receiving the syntactic based noncontiguous phrase rule set from the phrase extraction module, and for searching all of the possible phrases, translations, and probabilities in the phrase alignment table with respect to the sentence to be translated, and for outputting the translation results to the evaluation module.

According to another exemplary implementation of the above aspect, the syntactic based noncontiguous phrase abstract module includes a noncontiguous phrase extraction module for substituting the bilingual aligned contiguous phrases in each sentence of the bilingual aligned text with non-terminator according to alignment information generated by the word alignment module or the phrase alignment table generated by the phrase abstract module, so as to obtain the noncontiguous phrase rule set, and a syntactic filtering module for filtering the noncontiguous phrase rule set generated by the noncontiguous phrase extraction module based on syntactic annotated corpus, so as to generate the syntactic based noncontiguous phrase rule set.

According to another exemplary implementation of the above aspect, the probability information includes a probability of a certain word belonging to a certain gender, a probability of a certain phrase belonging to a certain phrase, and a context probability.

According to another exemplary implementation of the above aspect, the phrase alignment table includes source language phrases and probability values.

According to another aspect of the present invention, a syntactic analysis and hierarchical phrase model based machine translation method is provided. The machine translation method includes obtaining a syntactic based noncontiguous phrase rule set through a phrase alignment table obtained from a bilingual aligned text and a syntactic annotated corpus obtained from an annotated corpus, and outputting a translation result with respect to input sentences through the syntactic based noncontiguous phrase rule set.

According to an exemplary implementation of the above aspect, the obtaining of the syntactic based noncontiguous phrase rule set includes receiving a bilingual aligned text, and obtaining word alignment information from the received bilingual aligned text, extracting phrases based on the word alignment information so as to obtain a phrase alignment table, receiving an annotated corpus and the bilingual aligned text, extracting language knowledge and probability information from the annotated corpus, annotating bilingual or monolingual in bilingual aligned text with respect to gender and syntax based on the extracted language knowledge and probability information, and generating the syntactic annotated corpus, and performing syntactic based noncontiguous phrase extraction according to alignment information or the phrase alignment table based on the syntactic annotated corpus, so as to generate a syntactic based noncontiguous phrase rule set.

According to another exemplary implementation of the above aspect, the outputting of the translation result includes searching all of the possible phrases, translations, and probabilities in the noncontiguous phrase rule set according to the translation model with respect to a sentence to be translated, receiving an evaluation model, evaluating the translation results based on the evaluation model, and outputting a translation result with a highest score according to the evaluation.

According to another exemplary implementation of the above aspect, the outputting of the translation result includes searching all of the possible phrases, translations, and probabilities in the phrase alignment table with respect to the sentence to be translated.

According to another exemplary implementation of the above aspect, the generating of the syntactic based noncontiguous phrase rule set includes substituting the bilingual aligned contiguous phrases in each sentence of bilingual aligned text with a non-terminator according to alignment information or the phrase alignment table, so as to obtain the noncontiguous phrase rule set, and filtering the noncontiguous phrase rule set based on the syntactic annotated corpus, so as to generate the syntactic based noncontiguous phrase rule set.

According to another aspect of the present invention, a machine translation method is provided. The method includes receiving a bilingual aligned text and an annotated corpus, generating a bilingual aligned text based on the phrase to be translated, generating syntactic annotated corpus based on the annotated corpus and the bilingual aligned text, generating a phrase alignment table based on the bilingual aligned text, generating a syntactic based noncontiguous phrase rule set based on the syntactic annotated corpus and the phrase alignment table, machine translating an input sentence into a target language based on at least one of the phrase alignment table and the syntactic based noncontiguous phrase rule set, evaluating results of the machine translation based on an evaluation model; and outputting, as a translated sentence, a result of the evaluation having a highest score among the evaluated results.

The machine translation system and method performs syntactic analysis based on a common contiguous phrase based machine translation model, and extracts a syntactic based noncontiguous phrase rule set from a bilingual aligned text, so as to solve a problem of noncontiguous fixed custom in context of a whole sentence, and to comply with the syntactic feature of a language, translation is performed based on the noncontiguous phrase rule set and the phrase aligned table, and the translation results are evaluated based on the evaluation model, thereby improving the translation result.

By providing a syntactic analysis and hierarchical phrase model based machine translation system and method, the translation of noncontiguous fixed custom in context of a whole sentence can be addressed, thereby improving the translation result, and reducing the scale of the noncontiguous phrase rule set greatly, so as to suit for the application in an embedded system.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will become more apparent from the following description taken in conjunction with the accompanying drawings, in which:

FIGS. 2A-2D are diagrams for describing operations of a gender syntactic annotation module according to an exemplary embodiment of the present invention;

FIG. 5 is a diagram for describing operations of a syntactic filtering module according to an exemplary embodiment of the present invention;

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
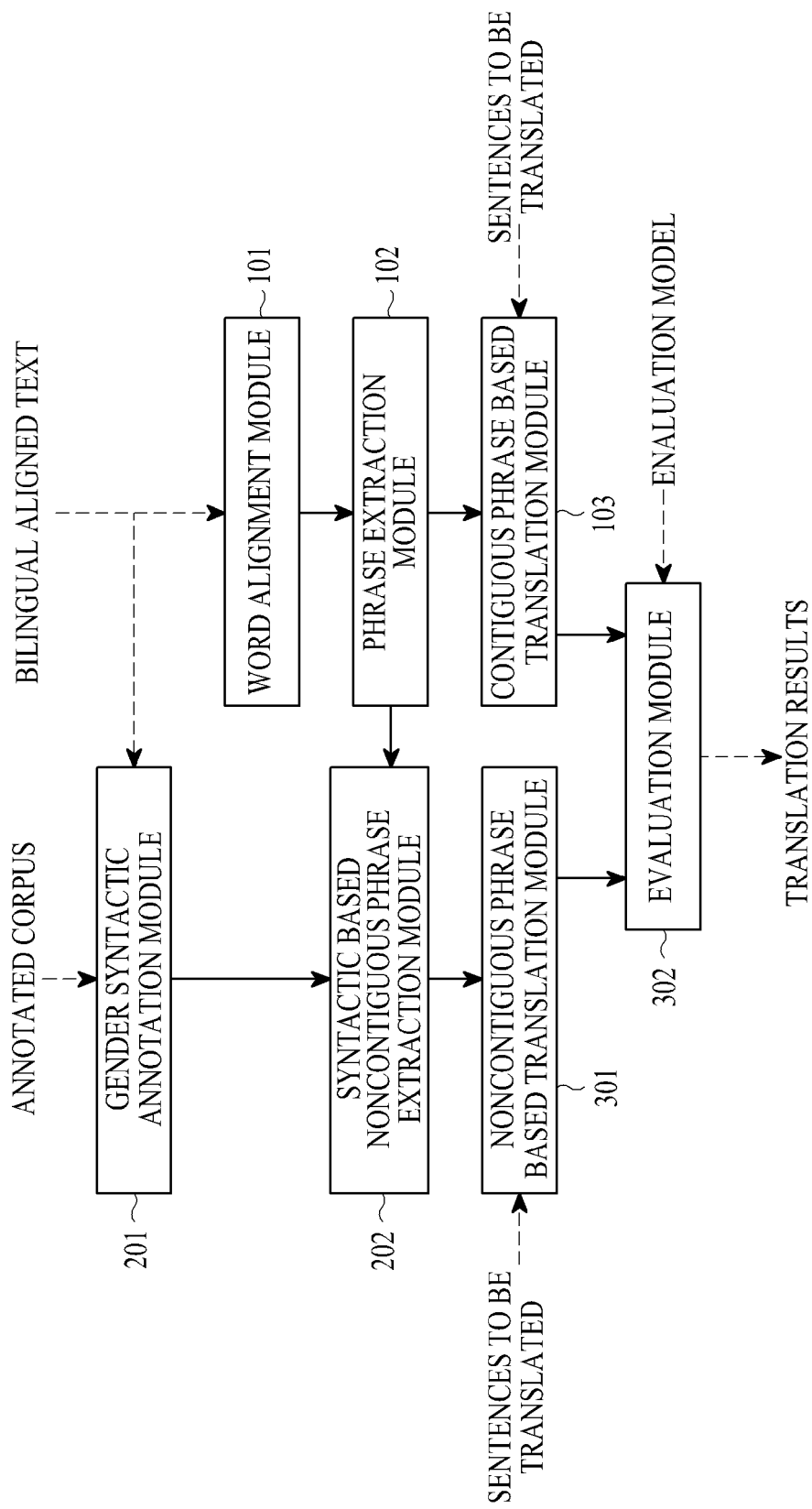
FIG. 1 is a block diagram for illustrating a syntactic analysis and hierarchical phrase model based machine translation system according to an exemplary embodiment of the present invention.

FIG. 1 illustrates a syntactic analysis and hierarchical phrase model based machine translation system according to an exemplary embodiment of the present invention.

Referring to FIG. 1, a syntactic analysis and hierarchical phrase model based machine translation system according to an exemplary embodiment of the present invention includes a word alignment module 101, a phrase extraction module 102, a contiguous phrase based translation module 103, a gender syntactic annotation module 201, a syntactic based noncontiguous phrase extraction module 202, a noncontiguous phrase based translation module 301 and an evaluation module 302.

The word alignment module 101, the phrase extraction module 102, and the contiguous phrase based translation module 103 are modules used in conventional contiguous phase based translation system, and thus operations thereof will not be described in detail.

The word alignment module 101, the phrase extraction module 102, the contiguous phrase based translation module 103, the gender syntactic annotation module 201, and the syntactic based noncontiguous phrase extraction module 202 comprise a preprocessing part of the syntactic analysis and hierarchical phrase model based machine translation system. The contiguous phrase based translation module 103, the noncontiguous phrase based translation module 301, and the evaluation module 302 can comprise a translation engine of the syntactic analysis and hierarchical phrase model based machine translation system according to an exemplary embodiment of the present invention.

The word alignment module 101 obtains word alignment information from input bilingual texts using various tools, such as GIZA++. The word alignment information is input into the phrase abstract module 102.

The phrase extraction module 102 receives the word alignment information from the word alignment module 101, and extracts phrases using the received word alignment information, so as to obtain a phrase alignment table (also referred to as a contiguous phrase table). The obtained phrase alignment table is transmitted to the contiguous phrase based translation module 103 and the syntactic based noncontiguous phrase extraction module 202. The phrase alignment table may include source language phrases, target language phrases, and probability values.

When processing a natural language by a computer, a rule based syntactic analysis mainly uses Chomsky's context independent syntax. However, the rule base syntactic analysis cannot easily process the ambiguity of a natural language.

In recent years, improvements in the context independent syntax are embodied as two aspects. One aspect is that a probability context independent syntax is proposed by adding probability to a rule of the context independent syntax. The other aspect is that a probability glossary context independent syntax is proposed by considering the affect of a headword of the rule on a probability of the rule, in addition to adding probability to the rule.

This research combines a rule based idealism method with a statistics based experimentalism method, and obtains a better result, thereby providing a powerful technique for addressing the issue of syntactic ambiguousness. Probability syntax allocates a probability to a sentence or a symbol string of words, so that syntactic information, which is more detailed than a general context independent syntax, can be obtained. Probability context independent syntax is also a kind of context independent syntax, wherein each rule is annotated with a probability for selecting this rule. When each context independent rule is processed, assuming that context independent rules are independent in condition, a probability of each sentence is calculated by using a product of probabilities of rules when analyzing the sentence.

FIGS. 2A-2D are diagrams for describing the operations of the gender syntactic annotation module 201 illustrated in FIG. 1 according to an exemplary embodiment of the present invention.

Referring to FIGS. 2A-2D, specific operations of the gender syntactic annotation module 201 in constructing a syntactic annotated corpus (also referred to as tree-bank) are described with respect to a probability context independent syntax.

Figure 2A:
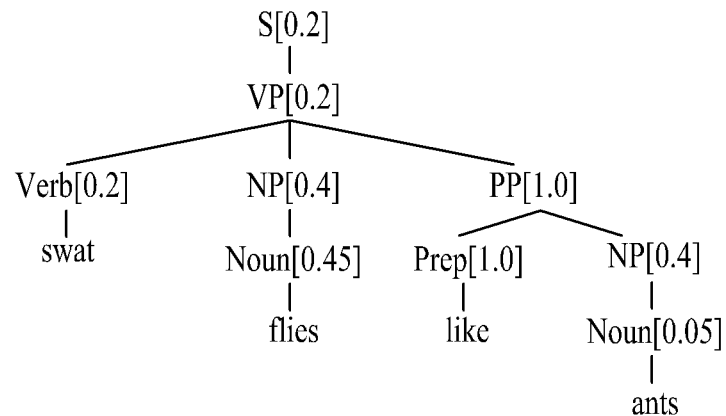

Corpuses with different layer annotation information are formed by annotating corpuses automatically or manually, such as Penn tree-bank annotated with gender and syntax tree information. The main annotation set is illustrated in FIG. 2A. The annotated corpus is input into the gender syntactic annotation module 201.

The gender syntactic annotation module 201 extracts useful language knowledge and probability distribution information thereof from the annotated corpus using a statistical tool, which is a supervised training method. The main probability information includes a probability that a certain word belongs to a certain gender, a probability that a certain phrase belongs to a certain phrase, and a context probability.

Figure 2B:
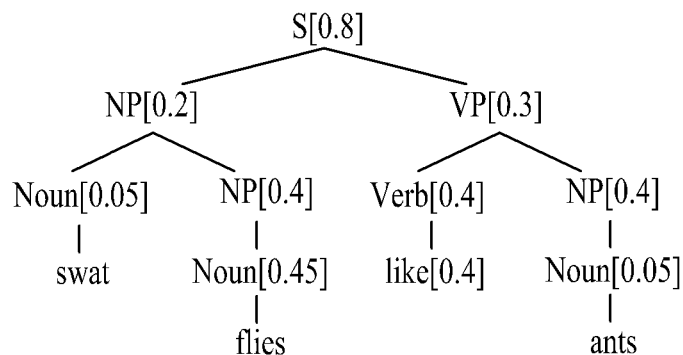

The gender syntactic annotation module 201 annotates bilingual or monolingual in bilingual aligned text with respect to gender and syntax using the extracted language knowledge and probability distribution information, generates a syntactic annotated corpus, and transmits the generated syntactic annotated corpus to the syntactic based noncontiguous phrase extraction module 202. A sentence probability includes a plurality of annotated results, and a result in which the probability is the highest is selected as an output result. As illustrated in (FIGS. 2A and 2B, according to the probability calculation, the probability of FIG. 2A is as follows: $P1=0.2\times 0.2\times 0.2\times 0.4\times 0.45\times 1.0\times 1.0\times 0.4\times 0.05=2.88\times 10\text{-}5$, and the probability of FIG. 2B is as follows: $P2=0.8\times 0.2\times 0.05\times 0.4\times 0.4\times 0.3\times 0.4\times 0.4\times 0.4\times 0.05=1.2288\times 10\text{-}6$. Accordingly, the annotated result of FIG. 2A is selected.

FIGS. 2C and 2D illustrate a part of syntactic annotated set and the annotated Chinese sentence respectively.

The syntactic based noncontiguous phrase extraction module 202 receives the syntactic annotated corpus from the gender syntactic annotation module 201, and performs syntactic based noncontiguous phrase extraction according to alignment information generated by the word alignment module 101 or the phrase alignment table generated by the phrase extraction module 102 based on syntactic annotated corpus, so as to obtain a syntactic based noncontiguous phrase rule set.

How the syntactic based noncontiguous phrase extraction module 202 generates the syntactic based noncontiguous phrase rule set is described below with respect to FIGS. 3-5.

Figure 3:
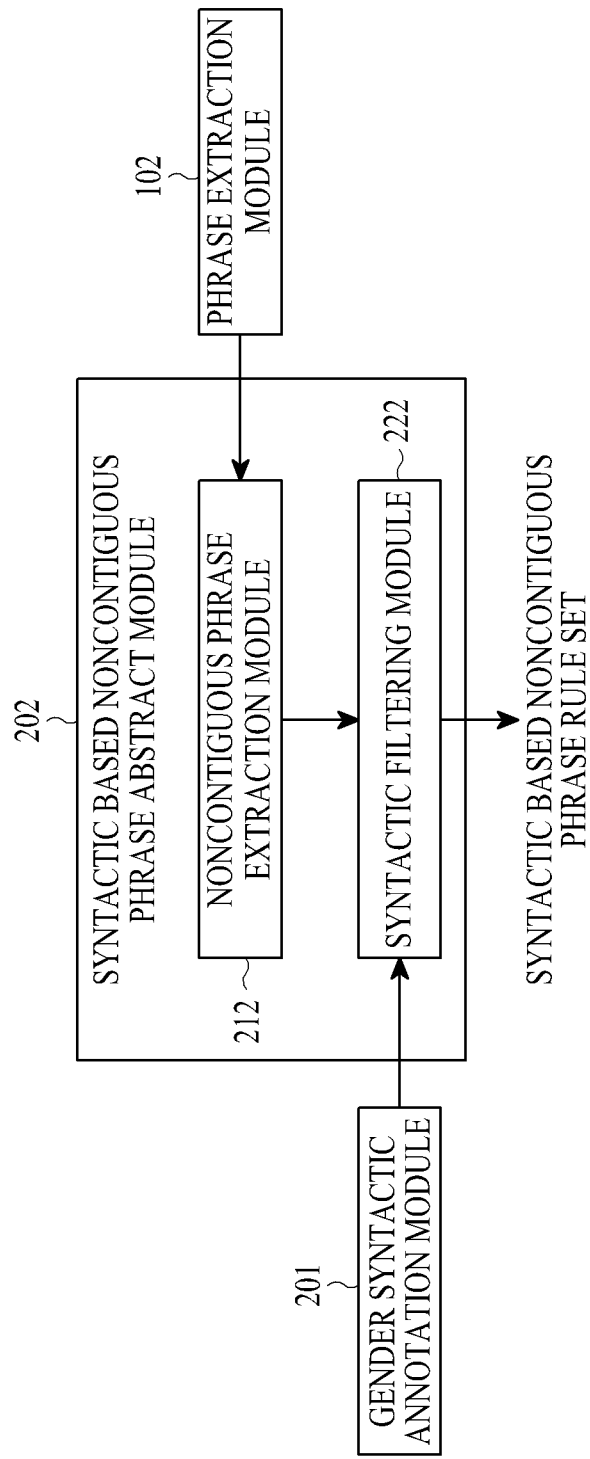
FIG. 3 is a diagram for illustrating a syntactic based noncontiguous phrase abstract module according to an exemplary embodiment of the present invention.
Figure 4:
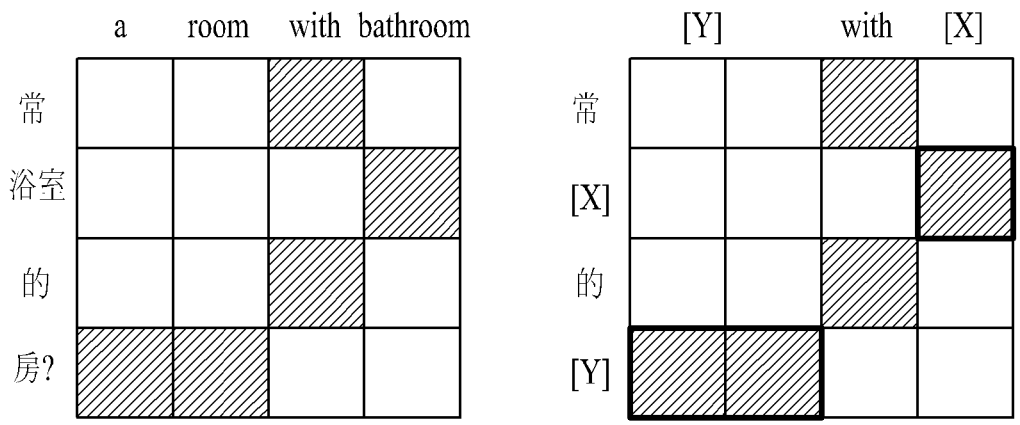
FIG. 4 is a diagram for describing operations of a syntactic based noncontiguous phrase abstract module according to an exemplary embodiment of the present invention.

FIG. 3 is a diagram for illustrating a syntactic based noncontiguous phrase abstract module according to an exemplary embodiment of the present invention, FIG. 4 is a diagram for describing the operations of a noncontiguous phrase extraction module 212 according to an exemplary embodiment of the present invention, and FIG. 5 is a diagram for describing the operations of a syntactic filtering module 222 illustrated in FIG. 3 an exemplary embodiment of the present invention.

Referring to FIG. 3, the syntactic based noncontiguous phrase extraction module 202 includes the noncontiguous phrase extraction module 212 and the syntactic filtering module 222. How the noncontiguous phrase extraction module 212 constructs a noncontiguous phrase rule set is described below with respect to FIG. 4.

The noncontiguous phrase extraction module 212 substitutes the bilingual aligned contiguous phrases in each sentence of bilingual aligned text with a non-terminator such as [X] and [Y] according to alignment information generated by the word alignment module 101 or the phrase alignment table generated by the phrase extraction module 102, so as to obtain the noncontiguous phrase rule set.

Referring to FIG. 4, an example of extracting a noncontiguous phrase rule is illustrated. The rule of this example is as follows: 带 [X] 的 [Y] ||| [Y] with [X] 0.1 0.3 0.6, wherein 0.1 is a translation probability from a source language to a target language, 0.3 is a word translation probability from a target language to a source language, and 0.6 is a word translation probability from a source language to a target language.

The basic concept for syntactic filtering of the noncontiguous phrase rule set is that a part of phrase to be extracted from a sentence is ensured to be a phrase being of a component of a sentence and being independent, such as a Noun Phrase (NP), a Quantifier Phrase (QP) etc., so as to ensure translation quality of sequent processes.

The syntactic filtering module 222 filters the noncontiguous phrase rule set generated by the noncontiguous phrase extraction module 212 based on syntactic annotated corpus, so as to generate the syntactic based noncontiguous phrase rule set. How the syntactic filtering module 222 performs the syntactic filtering is described below with respect to FIG. 5.

FIG. 5 is an example of filtering bilingual syntax parse of noncontiguous phrase rule set according to an exemplary embodiment of the present invention.

Considering a case that a Non-Pronoun and Non-Noun (NP-NN) phrase is substituted with [X] in an annotated sentence, (here the sentence is "地铁路线图"), the generated noncontiguous phrase rule is the remaining first part of the rule, as illustrated in FIG. 5.

Considering a case of a QP, in particular, the sentence is annotated with phrases of QP, and includes two sub-nodes, which are CD and CLP respectively, such as (QP(CD 两 ) (CLP (M张 ))), and CD is substituted with [X], herein it is " 两 ", the generated noncontiguous phrase rule is the second remaining rule illustrated in FIG. 5. Since the rule "[X] 给我地铁路线图吗 ?" illustrated in FIG. 5 does not comply with the syntactic rule, this rule is filtered out.

The translation engine of the syntactic analysis and hierarchical phrase model based machine translation system according to an exemplary embodiment of the present invention is described below with respect to FIG. 6.

The syntactic analysis and hierarchical phrase model based machine translation system according to exemplary embodiments of the present invention uses a translation model, a language model, an ordering model, and a decoder.

The syntactic analysis and hierarchical phrase model based machine translation system according to exemplary embodiments of the present invention differs from a contiguous phrase based machine translation system of conventional technology in a relative weakness of extension of the translation model and the ordering model.

The translation model provides corresponding translation relationship between the source language and the target language, and uses a probability to indicate a degree of such corresponding translation relationship. The higher the probability, the more accurate the corresponding translation relationship, which is used to provide possible target language translation for source language sentences. A hierarchical phrase based translation model extends the corresponding translation relationship from contiguous phrases to contiguous phrases and syntactic based noncontiguous phrases.

The language model stores a great amount of probability values. These probability values indicate probability relationship information between each word and its previous/following word or phrase thereof, the function thereof is to determine a degree of a phrase St complying with a target language syntax and custom, and is used to select the translation results. In general, a probability value PLM (St) is used to evaluate such degree; the higher the value of PLM (St), the more suitable the phrase is to the target language.

The ordering model is used to adjust the location orders of words or phrases in the translated target language results. Since there are syntactic based noncontiguous phrases, a part of functions of the ordering module is substituted, and the weight of the ordering module can be lowered correspondingly.

The translation engine is used to coordinate these modules for translating source language sentences.

Referring to FIG. 1, the contiguous phrase based translation module 103 receives the syntactic based noncontiguous phrase rule set from the phrase extraction module 102, and searches all of the possible phrases, translation and probabilities thereof in the syntactic based noncontiguous phrase rule set, with respect to sentences to be translated, which have been segmented for words.

Figure 6A:
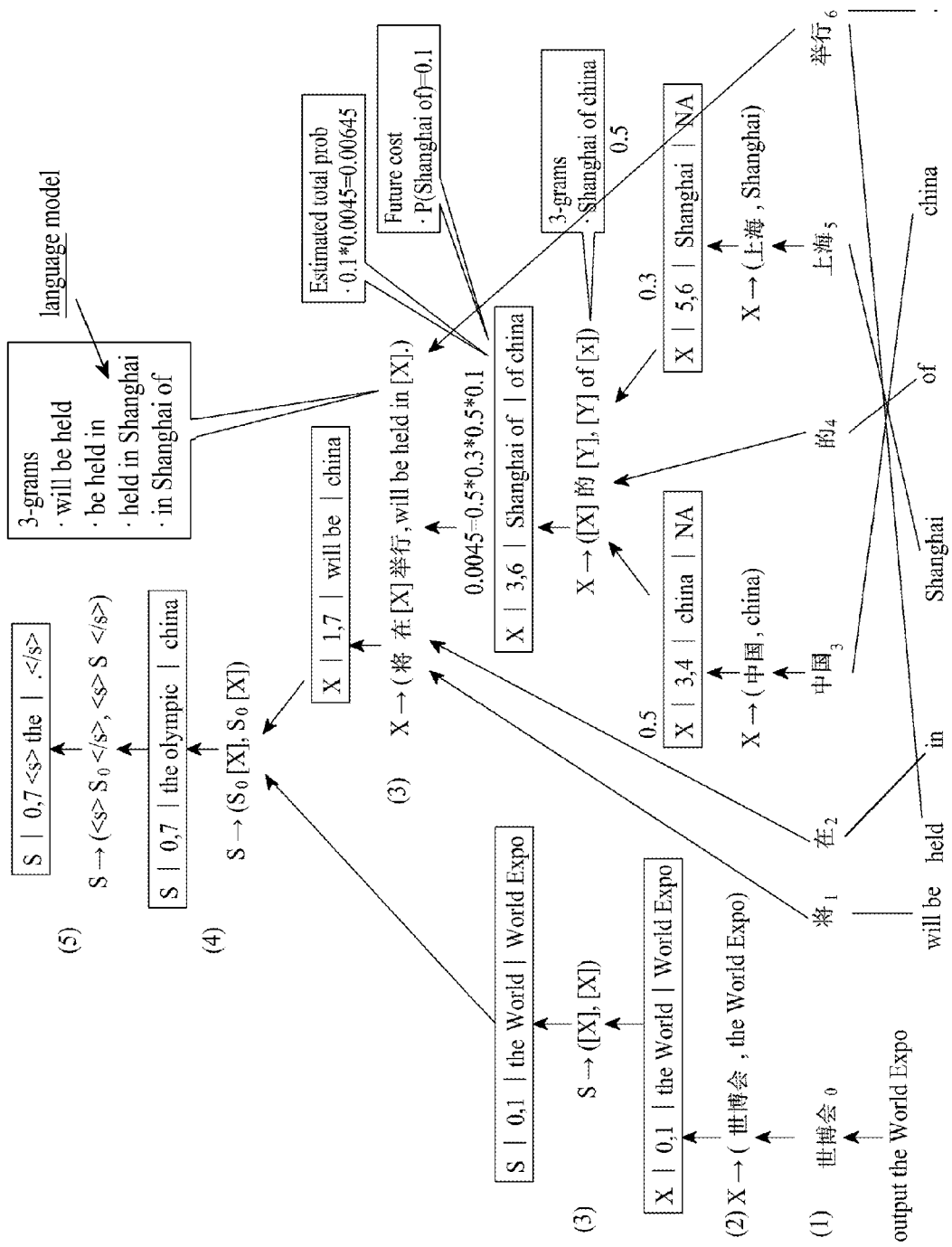
FIG. 6A is a diagram for describing translation through a syntactic analysis and hierarchical phrase model based machine translation system according to an exemplary embodiment of the present invention.
Figure 6B:
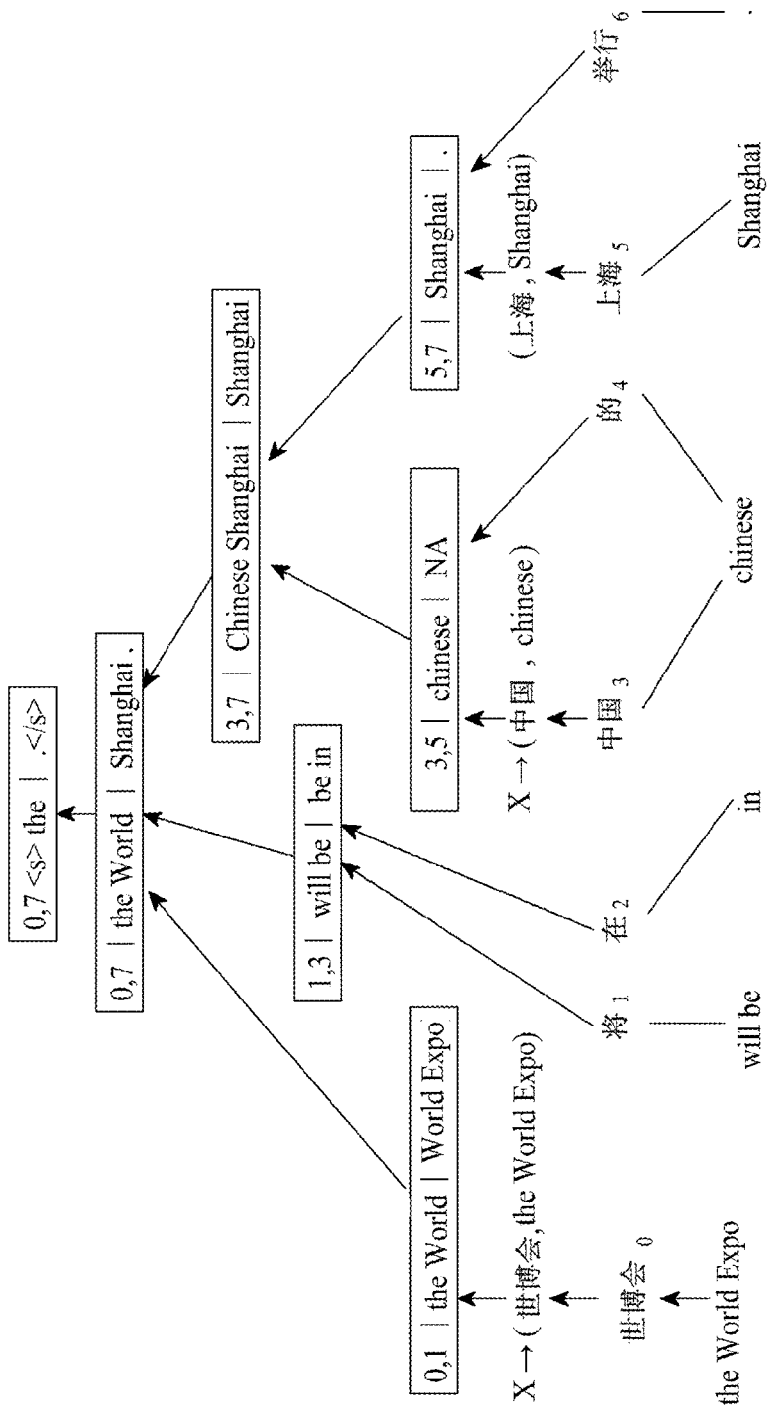
FIG. 6B is a diagram for describing translation through a mechanical translation system according to the related art.

FIG. 6A is a diagram for describing translation through a syntactic analysis and hierarchical phrase model based machine translation system according to an exemplary embodiment of the present invention, and FIG. 6B is a diagram for describing translation through a mechanical translation system according to an exemplary embodiment of the present invention.

Referring to FIG. 6A, reference numbers (1)-(5) correspond to the following operations (1)-(5) respectively:

(1) the system receives a Chinese sentence to be translated;

(2) the contiguous phrase based translation module 103 searches all of the possible phrases, translation and probabilities thereof in the phrase alignment table based on the translation model;

(3) the noncontiguous phrase based translation module 301 searches all of the possible phrases, translation and probabilities thereof in the syntactic based noncontiguous phrase rule set according to the translation model;

(4) the decoder calculates the total probability of respective possible translation results, according to the translation probabilities of a pair of phrases and noncontiguous phrases, the probability of the trigram language model, etc.; and (5) the decoder selects N sentences having higher total probability as the N-best candidate target language sentences.

In FIG. 6A, operations (4) and (5) indicate the total probability of calculations, so that the N-best candidate target language sentences are selected. In addition, the scope of |3, 6| is [3, 6), that is, the scope is greater than or equal to 3, and is less than (but not equal to) 6.

FIG. 6B is a diagram for describing translation through a mechanical translation system according to the related art. Compared with FIG. 6A, the main difference lies in that the translation process according to the conventional technique only uses contiguous phrases, without using hierarchical phrases filtered based on syntactic analysis. For example, X->([X]的 [Y], [Y] of [X]), a probability is calculated, and translation results are generated. For example, in the method of the present application, "中国的上海" is translated to "Shanghai of China"; however, the translation result according to the conventional technique is "Chinese Shanghai". Therefore, the translation result according to an exemplary embodiment of the present invention is better than that according the conventional technique.

The translation outputs that are input into the evaluation module 302 are the N-best candidate target language sentences, wherein N is larger than or equal to 1.

The evaluation module 302 evaluates the input N-best candidate target language sentences based on the input evaluation model. The evaluation model can reorder the N-best candidate target language sentences by combining a plurality of translation features, such as a language model feature, a sentence's gender sequence model feature, and length of a target language sentence, and selects the best overall translation as the translation result to be output.

Considering simplifying of the implementation and efficiency of processing, exemplary embodiments of the present invention are described with respect to the language model of a target language as the evaluation model, the function of which is to determine a degree of a sentence St that complies with the syntax of the target language and custom, thereby selecting the translation results. In general, the probability value PLM(St) is used to determine the degree. The higher the probability, the more suitable the sentence is to the target language.

Considering the difference among the efficiency of processing and the candidate target language sentences, in exemplary embodiments of the present invention, N is equal to 2, that is, there are two output sentences, one which is an output sentence translated only based on the contiguous phrase, and the other of which is an output sentence translated based on syntactic analysis and hierarchical phrase model.

The evaluation module 302 performs evaluations base on the following procedure:

1. Receiving N-best candidate target language sentences, wherein N is equal to 2, one of the two sentences is an output sentence translated only based on the contiguous phrase, and the other sentence is an output sentence translated based on syntactic analysis and hierarchical phrase model;

2. Calculating probability values of each possible translation by using the target language model (that is, through the language model); and 3. Selecting the output with best score.

An example of the evaluation module 302 performing evaluations will be described below.

The source language of the translation is Chinese, and the target language is English. The input source language sentence is "请告诉我支付条件".

Translation results are (N is equal to 2):

(i) Would you please tell me the pay terms (the translation result based on contiguous phrase).

(ii) Would you please tell me the terms of payment (the translation result based on syntactic analysis and hierarchical phrase model).

4. Evaluating the two translation results by using the English language model. Since "支付条件" has a common translation of "terms of payment", and the translation result "Would you please tell me the terms of payment" is more suitable to English syntactic rules and custom, the language model will allocate a higher score to this result:

(i) the score of the middle result 1 is 0.7; and (ii) the score of the middle result 2 is 0.9.

5. Selecting the result having the highest score as the final result: Would you please tell me the terms of payment.

A syntactic analysis and hierarchical phrase model based machine translation method according to an exemplary embodiment of the present invention will be described below with respect to FIG. 7.

Figure 7:
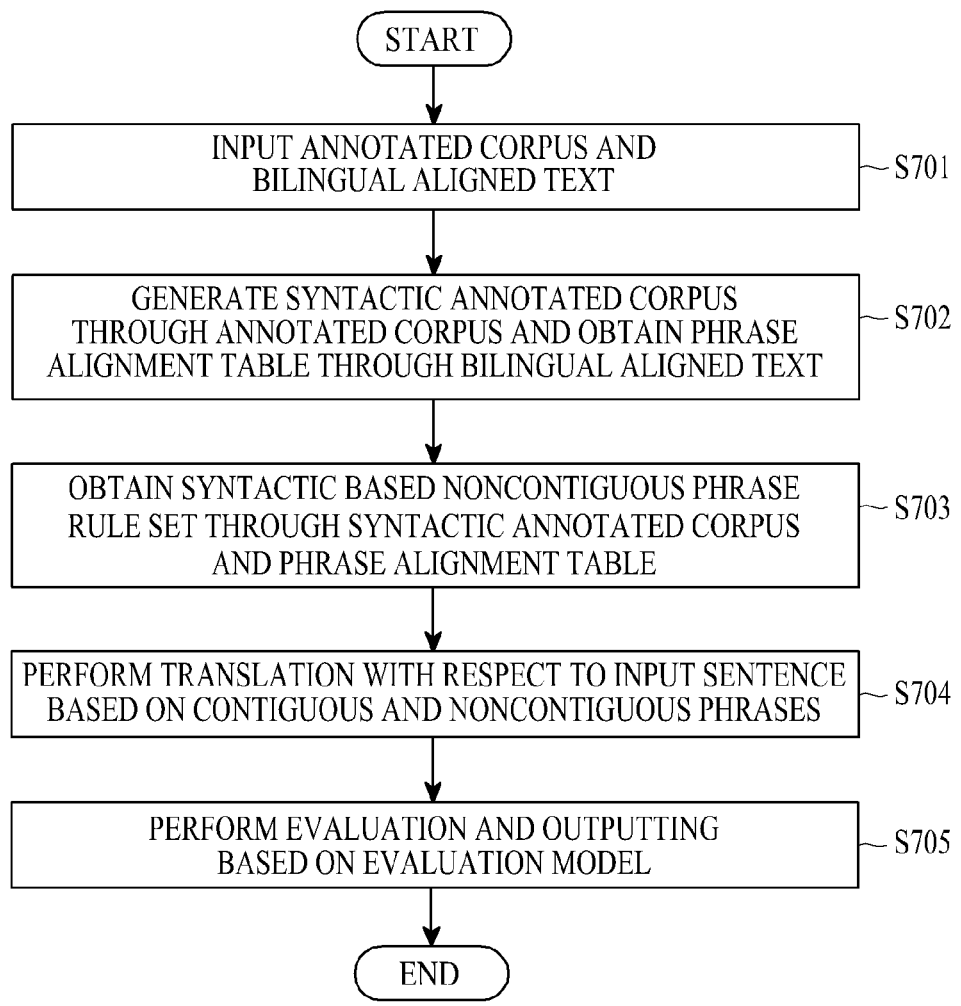
FIG. 7 is a flowchart for illustrating a mechanical translation process in a syntactic analysis and hierarchical phrase model based machine translation method according to an exemplary embodiment of the present invention.

FIG. 7 is a flowchart for illustrating a mechanical translation process in the syntactic analysis and hierarchical phrase model based machine translation method according to an exemplary embodiment of the present invention.

Referring to FIG. 7, in step S701, the annotated corpus and bilingual aligned text are input to the gender syntactic annotation module 201 and the word alignment module 101, respectively.

In step S702, the gender syntactic annotation module 201 performs annotation with respect to gender and syntax. First, the gender syntactic annotation module 201 extracts useful language knowledge and probability information from the input annotated corpus. The gender syntactic annotation module 201 annotates bilingual or monolingual in the input bilingual aligned text with respect to gender and syntax using the useful language knowledge and probability information, to generate syntactic annotated corpus (or is referred to as syntactic annotated tree-bank).

In step S702, the word alignment module 101 obtains word alignment information from the input bilingual aligned texts by using the GIZA++ tool.

The phrase extraction module 102 obtains a phrase alignment table by using the obtained word alignment information. The phrase alignment table includes source language phrases, target language phrases, and probability values.

In step S703, the syntactic based noncontiguous phrase extraction module 202 obtains a syntactic based noncontiguous phrase rule set based on the syntactic annotated corpus generated in step S702 according to the generated word alignment information or the obtained phrase alignment table.

The noncontiguous phrase extraction module 212 of the syntactic based noncontiguous phrase extraction module 202, based on the word alignment information or the phrase alignment table obtained in step 702, substitutes the bilingual aligned contiguous phrases in each sentence of bilingual aligned text with non-terminators such as [X] and [Y], so as to obtain a noncontiguous phrase rule set. The syntactic filtering module 222 of the syntactic based noncontiguous phrase extraction module 202 filters the syntactic annotated corpus obtained in step S702 with respect to syntax, so as to obtain the syntactic based noncontiguous phrase rule set.

In step S704, the contiguous phrase based translation module 103 and the noncontiguous phrase based translation module 301 search all of the possible phrases, noncontiguous phrases, translations, and probabilities thereof based on the translation model in the phrase alignment table or the syntactic based noncontiguous phrase rule set, and selects N sentences having the highest total probability as the N-best candidate target language sentences.

In step S705, the evaluation module 302 evaluates the N-best candidate target language sentences based on the language model and selects the best overall result as the final output.

The syntactic analysis and hierarchical phrase model based machine translation system and method according to exemplary embodiments of the present invention has been described with respect to the drawings. Those skilled in the art would understand art that the present invention is not limited to the above exemplary embodiments. For example, in order to obtain all of the possible translation results, the contiguous phrase based translation module 103 is included in FIG. 1, and a step for searching for all of the possible phrases, non-contiguous phrases, translations, and probabilities thereof in the phrase alignment table is included in step S707 of FIG. 7. However, it is possible that the contiguous phrase based translation module 103 is not included in FIG. 1, and the step for searching in the phrase alignment table is not included in step S707 of FIG. 7. In addition, according to exemplary embodiments of the present invention, the evaluation model is not limited to language model.

An experiment for translation from Korean to Chinese performed in a system based on an exemplary embodiment of the present invention is described below.

Test set type: a proportion of close test (test sentences are selected from the training set) is 20%, and a proportion of open test (test sentences do not belong to the training set) is 80%.

Results evaluated manually: compared with the convenient contiguous phrase based machine translation system, in the system according to an exemplary embodiment of the present invention, proportion of sentences, smoothness of which are improved greatly, among the sentences translated from Korean to Chinese increases by more than 10%, and proportion of "good" results evaluated manually reaches 86.5%.

In a currently popular embedded system of cell phone's hardware, the average speed of translation is two sentences per second, and a real-time translation may be realized.

The following table illustrates the comparison between the translations of an exemplary embodiment of the present invention and those of the conventional technique.

TABLE 1

| evaluation results for translations from Korean to Chinese | | S = 0 | S = 1 | S = 2 | S = 3 | S = 4 | S = 5 | S >= 4 |
|---|---|---|---|---|---|---|---|---|
| proportion (%) | the contiguous phrase based machine translation system | 0 | 1 | 3.5 | 20.5 | 50.75 | 24.25 | 75 |
| | exemplary embodiment of the present invention | 0 | 1. | 2 | 10.5 | 56 | 30.5 | 86.5 |

Two examples are illustrated below, one example with respect to translation from Korean to Chinese, and another example with respect to translation from Chinese to Korean.

EXAMPLE ONE

Translation from Korean to Chinese

In Table 2 below, the first column includes a source text, the second column includes a corresponding Chinese translation according to the related art, and the third column includes a corresponding Chinese translation according to an exemplary embodiment of the present invention.

TABLE 2

| 어디서 전화를 할 수 있습니까? | 在哪里能把电话吗? | 可以在哪里打电话吗? |
|---|---|---|
| 영어TV 채널이 있습니까? | 英语电视频道吗 | 有英文电视频道吗 |
| 창가에 있는 것을보여 주시겠습니까? | 窗窗的东西给我看下吗 | 能让我看一下靠窗的东西吗 |
| 42 사이즈를 입습니다. | 42 穿的尺码。 | 穿42号的。 |
| 점수가 어떻게 되지요? | 是多少? | 分数是多少? |
| 여기서 담배 피워도 될까요? | 在这里抽烟吗? | 可以在这儿抽烟吗 |
| 술 몇 병까지 살수 | 能买到几瓶酒吗? | 最多可以买几瓶酒 |

TABLE 2-continued

| 있나요? | | 呢? |
|---|---|---|
| 개인적인 것 좀 물어도 될까요? | 个人问您一下吗? | 可以问您些个人的东西吗? |
| 방 비호를 다시 알려주시겠어요? | 再告诉我您的房间号吗? | 能再说遍您的房间号吗? |
| 저 외투가 많어드는데요 | 我喜欢外套。 | 我喜欢那件外套。 |
| 비행기가 몇 시에 떠나나요? | 的飞机几点出发? | 飞机什么时候离开? |
| 주문할게요 | 再点菜。 | 我们要点菜。 |
| 영어를 할 줄 아는 의사가 필요합니다. | 英语会做的医生需要。 | 需要会说英语的医生。 |

EXAMPLE TWO

Translations from Chinese to Korea

The sentence in Chinese: 请把我的包送去我的房间.

The translation result based on the contiguous phrase is: 방 가방을 보내 주세요. (This translation is incorrect).

The translation result based on the syntactic analysis and hierarchical phrase model of an exemplary embodiment of the present invention is: 짐을 제 방으로 가지 다 주세요. (This translation is correct).

Compared with the contiguous phrase based machine translation system and method in the related art, the syntactic analysis and hierarchical phrase model based machine translation system and method according to an exemplary embodiment of the present invention can improve the accuracy of translations greatly, especially in a case of a scale of corpus being limited.

The syntactic analysis and hierarchical phrase model based machine translation system and method according to an exemplary embodiment of the present invention can be applied to a computer system, and can also applied to an embedded system.

Exemplary embodiments of the present invention introduce a hierarchical phrase model. The aligned noncontiguous phrase rule set is extracted and obtained from the aligned bilingual corpus, so as to solve the translation problem of noncontiguous fixed custom in context of a whole sentence.

The system according to exemplary embodiments of the present invention proposes gender syntactic annotation module and a syntactic based noncontiguous phrase extraction module, which are used to analyze and obtain a syntactic annotated tree (that is, sentences which are subjected to be annotated with respect to syntax) for respective sentences in the corpus. The syntactic based noncontiguous phrase rule set is obtained based on the syntactic annotated tree, which complies with the syntactic feature of a language, thereby improving the translation result, and reducing the scale of the noncontiguous phrase rule set greatly, so as to suit for the application in the embedded system.

Exemplary embodiments of the present invention evaluate and select the translation results based on the evaluation model, output the translation result having the highest score as the final result, thereby effectively combining advantages of respective translation model, ensuring the extension of the system, and further improving the translation result.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A syntactic analysis and hierarchical phrase model based machine translation system, the system comprising:
   a preprocessing part for obtaining a syntactic based noncontiguous phrase rule set through a phrase alignment table obtained from a bilingual aligned text and a syntactic annotated corpus obtained from an annotated corpus, comprising a gender syntactic annotation module for receiving the annotated corpus and the bilingual aligned text, for extracting language knowledge and probability information from the annotated corpus, for annotating bilingual or monolingual in bilingual aligned text with respect to gender and syntax based on the extracted useful language knowledge and probability information, and for generating the syntactic annotated corpus; and
   a translation engine for outputting a translation result with respect to input sentences through the syntactic based noncontiguous phrase rule set received from the preprocessing part.

2. The system of claim 1, wherein the preprocessing part further comprises:
   a word alignment module for receiving the bilingual aligned text, and for obtaining word alignment information from the received bilingual aligned text;
   a phrase extraction module for receiving the word alignment information from the word alignment module, and for extracting phrases based on the received word alignment information so as to obtain a phrase alignment table; and
   a syntactic based noncontiguous phrase extraction module for receiving the syntactic annotated corpus from the gender syntactic annotation module, and for performing syntactic based noncontiguous phrase extraction according to alignment information generated by the word alignment module or the phrase alignment table generated by the phrase extraction module based on the syntactic annotated corpus, so as to generate a syntactic based noncontiguous phrase rule set.

3. The system of claim 1, wherein the translation engine comprises:
   a noncontiguous phrase based translation module for receiving the syntactic based noncontiguous phrase rule set from the syntactic based noncontiguous phrase extraction module of the preprocessing part, for searching all of the possible phrases, translations, and probabilities thereof in the syntactic based noncontiguous phrase rule set according to the translation model with respect to a sentence to be translated, and for outputting translation results based on the sentence to be translated and the search; and an evaluation module for receiving an evaluation model, for evaluating the translation results based on the evaluation model, and for outputting a translation result with the highest score according to the evaluation.

4. The system of claim 1, wherein the translation engine further comprises:

a contiguous phrase based translation module for receiving the syntactic based noncontiguous phrase rule set from the phrase extraction module, and for searching all of the possible phrases, translations, and probabilities in the phrase alignment table with respect to the sentence to be translated, and for outputting the translation results to the evaluation module.

5. The system of claim 2, wherein the syntactic based noncontiguous phrase extraction module comprises:

a noncontiguous phrase extraction module for substituting the bilingual aligned contiguous phrases in each sentence of bilingual aligned text with non-terminator according to alignment information generated by the word alignment module or the phrase alignment table generated by the phrase extraction module, so as to obtain the noncontiguous phrase rule set; and a syntactic filtering module for filtering the noncontiguous phrase rule set generated by the noncontiguous phrase extraction module based on syntactic annotated corpus, so as to generate the syntactic based noncontiguous phrase rule set.

6. The system of claim 1, wherein the probability information comprises a probability of a certain word belonging to a certain gender, a probability of a certain phrase belonging to a certain phrase, and a context probability.

7. The system of claim 2, wherein the phrase alignment table comprises source language phrases, target language phrases, and probability values.

8. A syntactic analysis and hierarchical phrase model based machine translation method, the method comprising:

obtaining a syntactic based noncontiguous phrase rule set through a phrase alignment table obtained from a bilingual aligned text and a syntactic annotated corpus obtained from an annotated corpus;

receiving an annotated corpus and the bilingual aligned text, extracting useful language knowledge and probability information from the annotated corpus, annotating bilingual or monolingual in bilingual aligned text with respect to gender and syntax based on the abstracted useful language knowledge and probability information, and generating the syntactic annotated corpus; and outputting a translation result with respect to input sentences through the syntactic based noncontiguous phrase rule set.

9. The method of claim 8, wherein the obtaining of the syntactic based noncontiguous phrase rule set comprises:

receiving the bilingual aligned text, and obtaining word alignment information from the received bilingual aligned text;

extracting phrases based on the word bilingual information so as to obtain a phrase alignment table; and performing syntactic based noncontiguous phrase extraction according to alignment information or the phrase alignment table based on the syntactic annotated corpus, so as to generate a syntactic based noncontiguous phrase rule set.

10. The method of claim 8, wherein the outputting of the translation result comprises:

searching all of the possible phrases, translations, and probabilities in the syntax based noncontiguous phrase rule set according to the translation model with respect to a sentence to be translated; and receiving an evaluation model, evaluating the translation results based on the evaluation model, and outputting a translation result with the highest score according to the evaluation.

11. The method of claim 8, wherein the outputting of the translation result comprises:

searching all of the possible phrases, translations, and probabilities in the phrase alignment table with respect to the sentence to be translated.

12. The method of claim 9, wherein the generating of the syntactic based noncontiguous phrase rule set comprises:

substituting the bilingual aligned contiguous phrases in each sentence of bilingual aligned text with a non-terminator according to alignment information or the phrase alignment table, so as to obtain the noncontiguous phrase rule set; and filtering the noncontiguous phrase rule set based on syntactic annotated corpus, so as to generate the syntactic based noncontiguous phrase rule set.

13. The method of claim 8, wherein the probability information comprises a probability of a certain word belonging to a certain gender, a probability of a certain phrase belongs to a certain phrase, and a context probability.

14. The method of claim 9, wherein the phrase alignment table comprises source language phrases, target language phrases, and probability values.

15. A machine translation method comprising:

receiving a bilingual aligned text and an annotated corpus;

generating a bilingual aligned text based on the phrase to be translated;

generating syntactic annotated corpus based on the annotated corpus and the bilingual aligned text by extracting useful language knowledge and probability information from the annotated corpus, annotating bilingual or monolingual in bilingual aligned text with respect to gender and syntax based on the abstracted useful language knowledge and probability information, and generating the syntactic annotated corpus;

generating a phrase alignment table based on the bilingual aligned text;

generating a syntactic based noncontiguous phrase rule set based on the syntactic annotated corpus and the phrase alignment table;

machine translating an input sentence into a target language based on at least one of the phrase alignment table and the syntactic based noncontiguous phrase rule set;

evaluating results of the machine translation based on an evaluation model; and outputting, as a translated sentence, a result of the evaluation having a highest score among the evaluated results.

* * * * *